United States Patent [19]

Ohtomo

[11] Patent Number: 4,825,419
[45] Date of Patent: Apr. 25, 1989

[54] OPTICAL INFORMATION STORAGE APPARATUS

[75] Inventor: Junichi Ohtomo, Yokohama, Japan

[73] Assignee: Kabushiki Kaisha Toshiba, Kawasaki, Japan

[21] Appl. No.: 137,944

[22] Filed: Dec. 28, 1987

[30] Foreign Application Priority Data

Dec. 27, 1986 [JP] Japan .................................. 61-311887

[51] Int. Cl.$^4$ ............................................. G11C 13/00
[52] U.S. Cl. ..................................... 365/218; 365/127
[58] Field of Search ................... 365/45, 47, 127, 215, 365/218, 230

[56] References Cited

U.S. PATENT DOCUMENTS 4,115,768  9/1978  Eggenberger et al. .............. 340/347
4,485,411  11/1984  Yamamoto ........................... 358/296

Primary Examiner—Terrell W. Fears
Attorney, Agent, or Firm—Foley & Lardner, Schwartz, Jeffery, Schwaab, Mack, Blumenthal & Evans

[57] ABSTRACT

In an optical information storage apparatus including an optical information storing medium having a retrieval index storing area and an information storing area, the apparatus comprises an optical head for recording and reading information on and from the optical information storing medium and a signal generator for generating a delete signal to the optical head in order to directly or perfectly delete (destroy) information recorded on the information area of the storing medium, in addition to the indirect deletion of a retrieval index. Further, the above direct and indirect deletions can be selected by the operator. The above apparatus is useful in particular to delete confidential documents stored in a picture information filing system, for instance.

8 Claims, 6 Drawing Sheets

RECORDED PITS

RANDOM DELETION

MIN. PITCH DELETION

CONTINUOUS DELETION

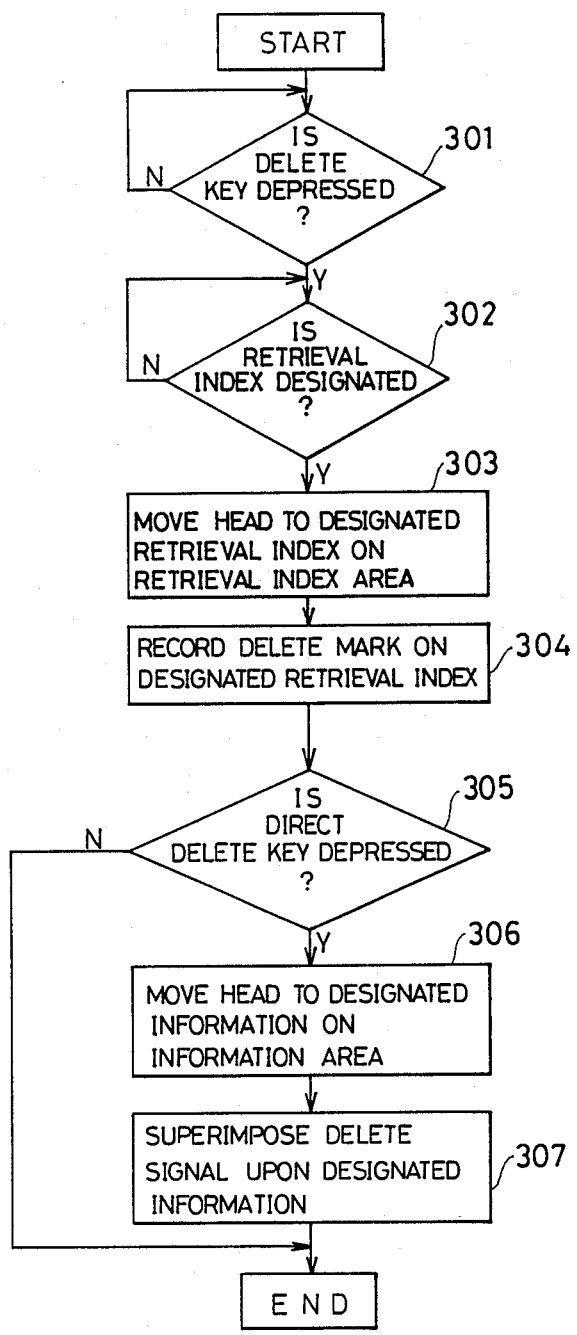

OPTICAL INFORMATION STORAGE APPARATUS

BACKGROUND OF THE INVENTION

1. Field of the Invention

The present invention relates generally to an optical information storage apparatus for recording and reading information on and from an information storage medium through an optical head, and more specifically to an optical information storage apparatus for a write-once read-many optical disc type.

2. Description of the Prior Art

Apparatus for recording and reading information on and from an information storage medium through optical head means (e.g. a laser beam) are well known. As one of the information storage media, an information storage medium of write-once read many (WORM) optical disc type is also known. Since the storage medium of WORM type is not erasable, information are recorded in sequence on areas where information data have not yet been recorded. Further, in the WORM optical disc, information data are recorded by forming pits with different pit lengths and pit pitches in spiral fashion on the disc, and read by applying a laser beam to the pits to detect recorded data on the basis of physical change in the laser beam, in the same way as in information storage media of read-only type (called compact disc).

The above-mentioned WORM type optical disc or an optical information storage medium has widely been used, because a great number of information data can be recorded and read in spite of a relatively simple system configuration. Further, since the volume of information data recorded on the optical disc is huge, the WORM type optical disc is usually divided into two areas. The first area is called a retrieval index storing area on which only retrieval indices representative of information documents, for instance are recorded for providing an easy retrieval of huge information recorded. The second area is called an information storing area on which various information are recorded being arranged on the basis of recorded retrieval indices.

In the above-mentioned optical disc, when an information document is required to be deleted, conventionally, the document is usually deleted indirectly only on retrieval index storing area by recording a delete mark (flag) thereon. In other words, when an information document is required to read through the apparatus, a retrieval index recorded on the retrieval index storing area is first read in sequence to check block numbers on which a target information document is recorded. In this step, if the retrieval index has already been deleted and therefore a delete flag rises, the information document corresponding to the deleted retrieval index is not read, indicating that the information document is deleted. That is, the information document is processed as if it were deleted from the disc on the basis of a delete mark recorded on the retrieval index storing area.

In the above-mentioned information storage apparatus however, although a retrieval index of an information document required to be deleted is deleted, since actual information data corresponding to the deleted retrieval index are still kept as they are, there exists a problem in that the deleted information document can be read by disregarding the delete mark recorded on the retrieval index storing area.

In other words, when a recorded information document is strictly secret and therefore required to delete perfectly and completely, the prior-art optical information storage apparatus is not satisfactory from the functional standpoint.

SUMMARY OF THE INVENTION

With these problems in mind, therefore, it is the primary object of the present invention to provide an optical information storage apparatus of WORM (write-onece read-many) type which can directly delete information data recorded on the information storing area of an optical information storing medium.

Further, it is another object of the present invention to provide an optical information storage apparatus of WORM type which can allow the operator to select an indirect deletion such that only a retrieval index is deleted on the retrieval index storing area and a direct deletion such that a retrieval index recorded on the retrieval index storing area and information recorded on the information storing area are both deleted simultaneously.

To achieve the above-mentioned object, an optical information storage apparatus, of the present invention, comprises: (a) optical information storing medium, having a retrieval index storing area and an information storing area, for storing information on the information storing area on the basis of a retrieval index stored in the retrieval index storing area; (b) optical head means, optically coupled to said optical information storing medium, for recording and reading information on and from said optical information storing medium; and (c) deleting means, electrically coupled to said optical head means, for directly deleting information recorded on the information storing area of said optical information storing medium in addition to an indirect deletion of the retrieval index stored in the retrieval index storing area.

The deleting means is a signal generator for outputting a delete signal to said optical head means to superimpose delete pits upon information pits recorded on said optical information storing means. The signal generator is a random number signal generator, a minimum pit pitch signal generator or a continuous signal generator.

Further, to achieve the above-mentioned object, a method of deleting information recorded on an optical information storing medium having a retrieval index storing area and an information storing area through an optical storage apparatus including an optical head, a keyboard having a delete key, a direct delete key and an alpha/numeric keys, according to the present invention, comprises the following steps of: (a) checking whether the delete key is depressed, (b) if depressed, checking whether a retrieval index to be deleted is designated through the alpha/numeric keys; (c) if designated, moving the optical head to the designated retrieval index position recorded on the retrieval index storing area on the basis of the designated retrieval index; (d) record a delete mark on the designated retrieval index position; (e) checking whether the direct delete key is depressed; (f) if depressed, moving the optical head to the designated information position recorded on the information storing area on the basis of the designated retrieval index; and (g) superimposing a delete signal upon the recorded information to directly delete the recorded information.

BRIEF DESCRIPTION OF THE DRAWINGS

The features and advantages of the optical information storage apparatus according to the present invention will be more clearly appreciated from the following description of the preferred embodiment of the invention taken in conjunction with the accompanying drawings in which:

FIG. 5 is a flowchart showing the direct deletion operation of information recorded on the information storing area of the optical disc according to the present invention.

DETAILED DESCRIPTION OF THE PREFERRED EMBODIMENTS

An optical information storage apparatus of the present invention will be explained hereinbelow with respect to its application to a picture information filing apparatus by way of example.

When an original is set on an original table (not shown), the original is subjected to 2-dimensional scanning by a laser scanning system (not shown) for reading the picture information. The picture information is recorded on an information recording area of an optical disc (information storage medium). Further, a retrieval index having a retrieval code, a recording address, a length of the picture information and a deletion mark (flag) representative of picture information deletion (where necessary) is recorded on a retrieval index recording area of the same optical disc, as described later in further detail with reference to the attached drawings.

The picture information recorded on the optical disc is retrieved on the basis of a retrieval code entered from a keyboard and displayed at a display device.

Figure 1:
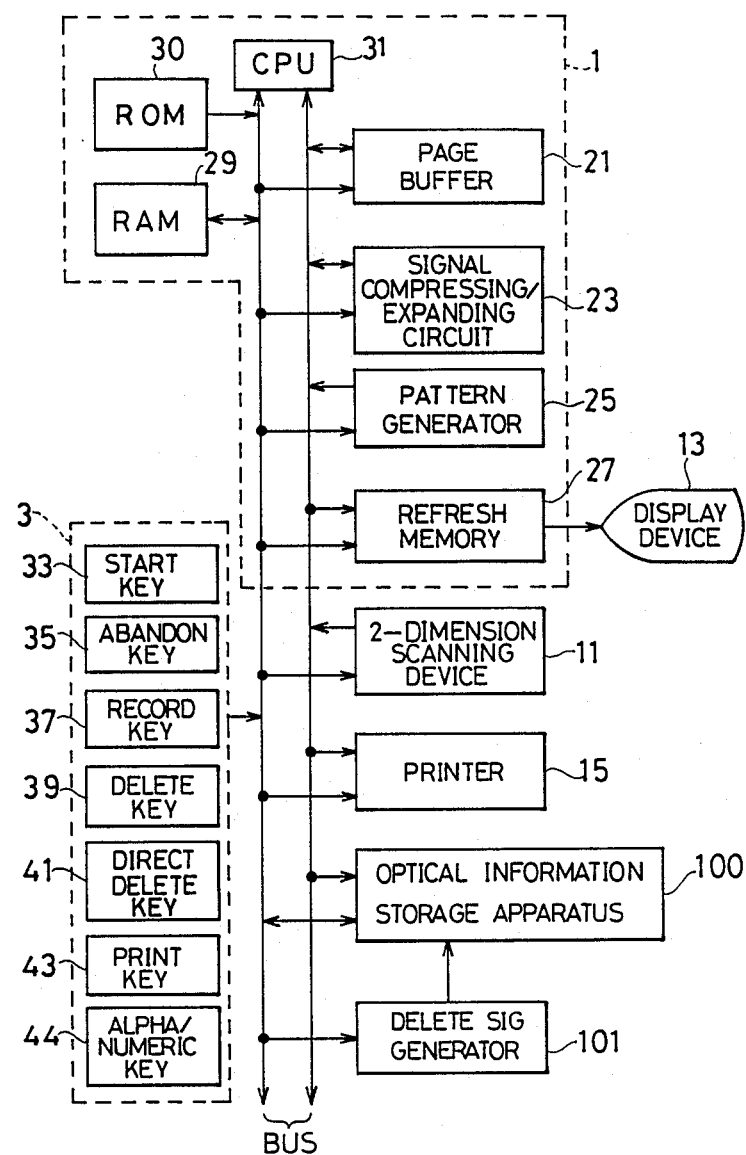
FIG. 1 is a block diagram showing a main control device and an input device of a picture information filing apparatus to which the optical information storage apparatus of the present invention is applied.

FIG. 1 is a block diagram showing the main control device and the input device of the picture information filing apparatus. According to information entered from an input device 3 (e.g. a keyboard), the main control device 1 implements editing processes such as recording, reprediction, addition, insertion, deletion and so on of picture information and retrieval indices, and controls operations of various devices connected to this main control device 1.

Picture information such as a document is photoelectrically converted by a 2-dimension scanning device 11. The converted picture information (video signal) is supplied through the main control device 1 to a display device 13 such as a CRT display, and a printer 15 or an optical information storage apparatus 100 of the present invention.

The display device 13 displays a retrieval index entered through the keyboard 3 and the picture information obtained through the 2-dimension scanning device 11 or from the optical information storage apparatus 100. The printer 15 receives the picture information from the 2-dimension scanning device 11 or from the optical information storage apparatus 100, and forms a 2-dimensional visible image, which is output as a hard copy.

With reference to FIG. 1 again, the main control device 1 comprises a page buffer 21 for storing picture information in units of pages, a signal compressing/expanding circuit (compandor) 23 for performing signal compression and expansion by MH (modified Hoffman) conversion or the MH inverse conversion, a pattern generator 25 for generating a character pattern, a refresh memory 27 for storing information to be displayed on a display device 13, a random access memory (RAM) 29 having a capacity sufficient to store retrieval indices corresponding to one optical storage medium to be described later, and a central processing unit (CPU) 31 for controlling all the above-mentioned devices.

A read-only memory (ROM) device 30 is externally connected to the CPU 13 and stores control programs to control the devices described above.

The input device (keyboard) 3 includes a start key 33 depressed to store a retrieval index or to set an original; an abandon key 35 depressed to abandon the picture information stored in the page buffer 21; a record key 37 depressed to transfer the picture information stored in the page buffer 21 to the optical information storage apparatus 100; a delete key 39 depressed to indirectly delete picture information only on the retrieval index recording area on an optical disc; a direct delete key 41 depressed to directly delete picture information both on the retrieval index recording area and the information recording area on an optical disc, as described in further detail hereinafter; a print key 43 depressed when the hard copy of the picture information stored in the page buffer 21 is required; and alpha/numeric keys 44 corresponding to numerals 0 to 9 and letters of the alphabet.

Further, a delete signal generator 101 of the present invention is connected to the optical information storage apparatus 100 in order to directly delete (destroy) picture information recorded on the picture information recording area of the optical disc, as described later in further detail.

Figure 2:
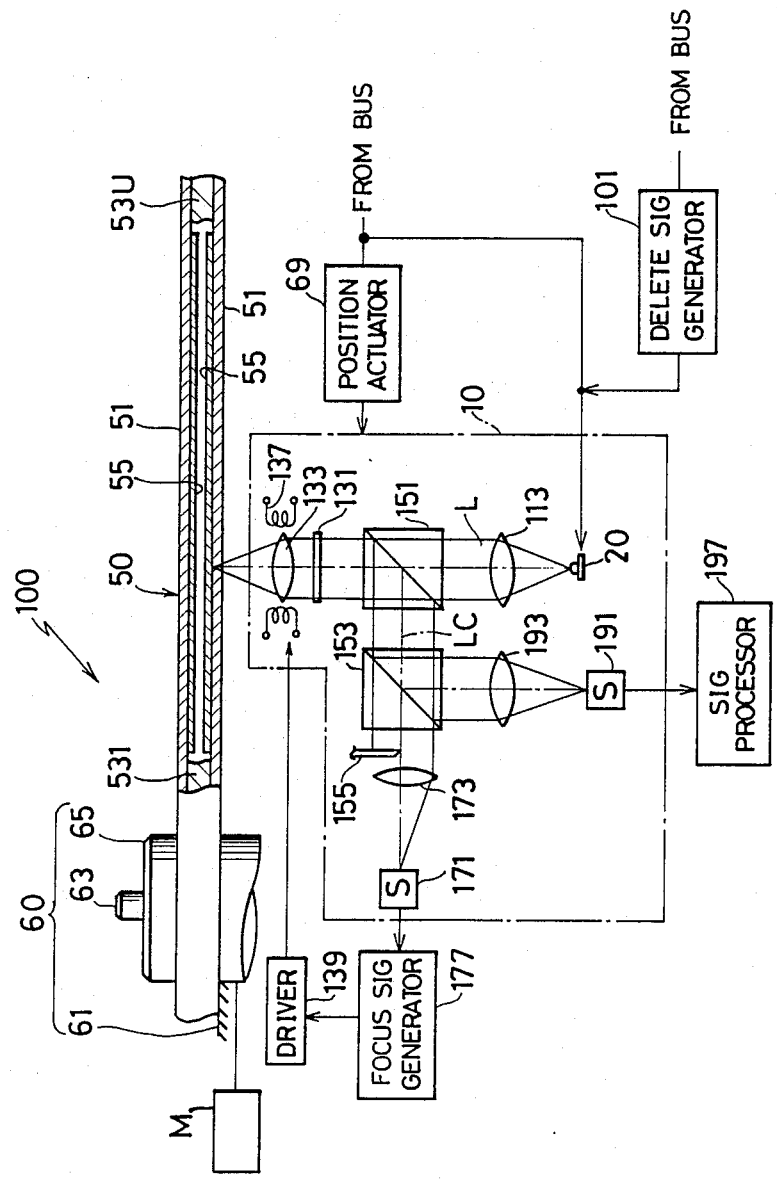
FIG. 2 is a block diagram showing an optical head opposed to an optical disc.

With reference to FIG. 2, the optical information storage apparatus 100 will be described in relation to an optical disc 50. The optical information storage medium (disc) 50 has various advantages such that information can be recorded and reproduced stably at high density in non-contact manner.

As shown, the optical disc 50 is formed by putting one transparent disc plate 51 upon the other 51 with inner and outer spacers 53I and 53U intervening between the two plates 51 and 51. On the inner surfaces of these two transparent plates 51 and 51, two light reflection layers 55 are formed as information recording layers, respectively, by means of evaporation technique. Further, on each of these light reflection layers 55, track guide grooves (tracking guides) are formed in spiral or concentric circular fashion. Information is recorded along these tracking guides in the form of pits P caused by a laser beam.

The optical disc 50 is formed with a central hole at the center thereof. When the optical disc 50 is mounted on a turntable 61 of the optical information storage apparatus 100, a center spindle 63 of the turntable 61 is passed through the central hole of the optical disc 50 so that both the rotational centers of the turntable 61 and the optical disc 50 coincide each other.

A chuck 65 is mounted around the center spindle 63 of the turntable 61 to firmly fix the optical disc 50 on the turntable 61. This turntable 61 is rotatably supported by a support base (not shown) and driven at a constant speed by a drive motor M.

A semiconductor laser (light emitting source) 20 for generating a laser beam L is provided within an optical head 10. The optical head 10 comprises a collimator lens 113, a polarizing beam splitter 151, a ¼ wavelength plate 131, an objective lens 133, a voice coil 137, a half prism 153, a shutter plate 155, a projective lens 173, a focus system photosensor 171, a focus signal generator 177, a voice coil driver 139, a convex lens 193, an information system photosensor 191 and an information signal processor 197, etc.

The operation of the optical head 10 will be described hereinbelow.

To record information on the optical disc 50, a laser beam L is generated from a semiconductor laser 20 in such a way that the intensity of the laser beam is modulated according to information to be recorded. On the other hand, to read information from the optical disc 50, a laser beam L having a constant light intensity is generated from the semiconductor laser 20. The divergent laser beam L generated from the semiconductor laser 20 is converted into a parallel beam through the collimator lens 113 and directed to the polarized beam splitter 151. The parallel laser beam L passed through the polarized beam splitter 151 is passed through the ¼ wavelength plate 131, being allowed to be incident upon the objective lens 133, and then focused on a light reflection layer 55 of the optical disc 50.

The objective lens 133 is supported by the voice coil 137 so as to be movable along the optical axis thereof. Therefore, when the objective lens 133 is appropriately positioned, a beam waist of the convergent laser beam L passed through the objective lens 133 is just focused on the surface of the light reflection layer 55 to form a minimum beam spot thereon.

Under these conditions where the objective lens 133 is focused, information is writable or readable. In recording information, pits P are formed along the tracking guide on the light reflection layer 55 by the laser beam L whose light intensity is modulated. In reading information, the laser beam L with a constant light intensity is modulated with respect to light intensity by the pits P when reflected from the pits P. The modulated laser beam L is returned to the optical head 10.

The divergent laser beam L reflected from the light reflection layer 7 of the optical disc 50 is converted into a parallel beam through the objective lens 133 and then returned to the polarizing beam splitter 151 via the ¼ wavelength plate 131. The laser beam L going and returning through the ¼ wavelength plate 131 is rotated by 90 degrees in polarization plane, as compared with that passed only through the polarizing beam splitter 151. This laser beam L whose polarization plane is rotated by 90 degrees will not pass through the polarization beam splitter 151 but reflected from this beam splitter 151. The laser beam L reflected from the beam splitter 151 is divided into two directions by the half mirror (or prism) 153. One of the laser beams is guided to the information system photosensor 191 via the convex lens 193.

Since the data detected by the photosensor 191 include information recorded on the optical disc 50, these data are fed to the signal processor 197. The data are converted into digital data indicative of picture information by the signal processor 197.

On the other hand, the other of the laser beams divided by the half mirror 153 is screened by a shutter plate 155 so that a half of the laser beam L separated by the optical axis $L_c$ is guided to the focus system photosensor 171 via the projective lens 173. The optical signal detected by the photosensor 171 is processed by the focus signal generator 177 to obtain a focus signal to be applied to the voice coil driver 139. This voice coil driver 139 drives the voice coil 137 in response to the focus signal so that the objective lens 133 can always be kept at the focused condition.

The optical head 10 is disposed so as to be movable in the radial direction of the optical disc 50 by a linear positioning actuator 69 or an pivotal arm (not shown). The position of the optical head 10 relative to the optical disc 50 can be determined freely by actuating this linear positioning actuator 69 on the basis of control signal supplied via the bus. The above-mentioned tracking control is composed of a coarse access control to move the optical head to a predetermined track position and a fine access control to move the optical axis of the objective lens of the optical head along a predetermined track.

Figure 3A:
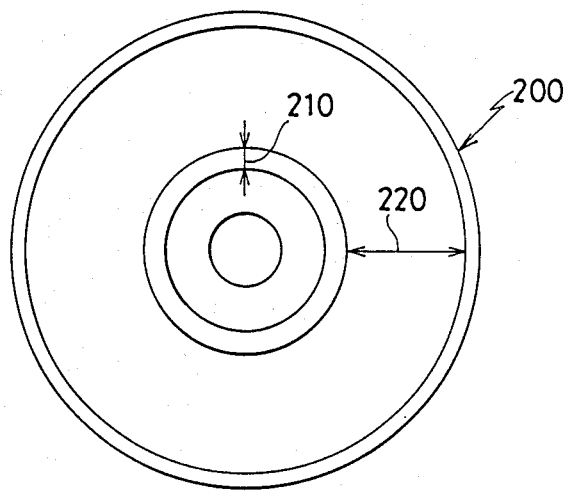
FIG. 3A is an outside view of an optical information storage medium used for the optical information storage apparatus shown in FIG. 1.

FIG. 3A shows on optical disc 200 which includes an area 210 for recording retrieval indices and an area 220 for recording picture information, as already described. This is because since the volume of information data recorded on the optical disc is huge, the information is properly arranged on the basis of a retrieval index corresponding to each information group.

Figure 3B:
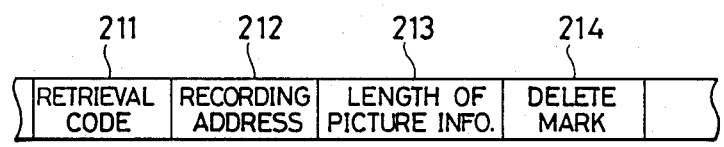
FIG. 3B is a view showing a recording format of a retrieval index to be recorded on the retrieval index storing area of the optical disc.

FIG. 3B shows a recording format of the retrieval index recorded on the retrieval index recording area 210. The retrieval index is made up of a retrieval code 211; a recording address 212 indicative of track numbers and block numbers where the picture information corresponding to a retrieval code is recorded; a length of picture information 213 indicative of the number of blocks at which picture information is recorded; and a delete mark (flag) 214 indicative of deletion of the corresponding retrieval index. Here, it should be noted that when the retrieval code is deleted by this delete mark, the picture information corresponding to the deleted retrieval index is indirectly deleted. However, since it may be possible to read the picture information indirectly deleted via the retrieval index by some method or other, it is preferable to delete some confidential picture documents directly or perfectly.

Figure 3C:
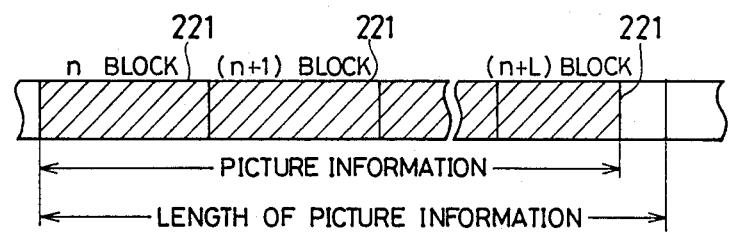
FIG. 3C is a view showing a recording format of information to be recorded on the information storing area of the optical disc.

FIG. 3C shows a recording format on the information recording area 220, where picture information 221 is recorded along a plurality of blocks.

To record picture information on the optical disc 200, a laser beam modulated according to picture information to be recorded is applied to the optical disc 200 to form pits on the basis of thermal or optical energy. To read picture information from the optical disc 200, a laser beam is applied to the pits to detect the physical change of the laser beam.

Further, to record picture information on the optical disc 200, a retrieval index including a retrieval code, a recording address, and a picture information length is recorded on the retrieval index recording area 210 and then picture information corresponding to the recorded retrieval index is recorded on the information recording area 220 in accordance with the recorded retrieval index.

To read picture information from the optical disc 200 shown in FIG. 3A, a retrieval index corresponding to a required picture information (file) is first retrieved in the retrieval index recording area 210. In accordance with this retrieval index, the recording address and the length of the corresponding picture information are determined to read the picture information recorded on the area 220.

To record other picture information to the optical disc 200, a retrieval index and a picture information are recorded in sequence on an area at which no information is not yet recorded.

Being different from the conventional way that only a delete mark 214 is recorded on the retrieval index recording area 210 to indirectly delete the picture information recorded on the recording area 220, the feature of the present invention is to further delete the picture information recorded on the recording area 220 directly and perfectly. In addition, it is possible to select the above-mentioned indirect and direct deleting methods freely by use of the direct delete key 41 of the keyboard 3 (FIG. 1).

With reference to FIGS. 4A to 4D, the method of deleting picture information once recorded on the information recording area 220 on the optical disc 200 will be described hereinbelow.

Figure 4A:
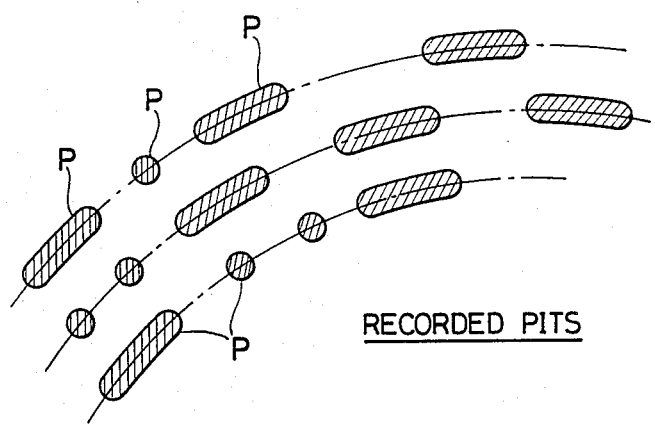
FIG. 4A is an illustration showing an example of an original pits arrangement formed on the optical information storage medium.

FIG. 4A shows an example of picture information recorded on the area 220, in which pits P are shown by circular recesses and circular arc shaped recesses. However, the pitch and the circular arc length change according to the recording method.

Figure 4B:
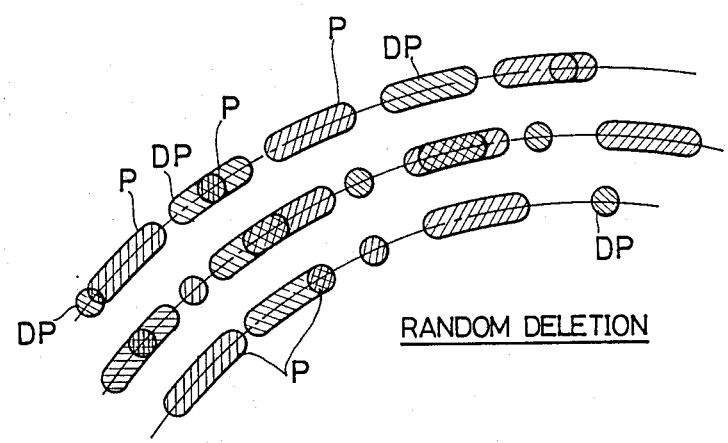
FIG. 4B is an illustration showing delete pits formed at random along the original pit arrangement.

FIG. 4B shows an example where the recorded pits P are destroyed or deleted by additionally forming random delete pits DP (whose pitch and the circular arc length are at random) upon the information pits P. To delete the recorded information in this way, a delete signal generator 100 shown in FIGS. 1 and 2 is a random number generator for generating a random number signal to the semiconductor laser 20. The random number signal thus generated is applied to the optical disc 200 to superimpose random delete pits upon the recorded picture information pits P.

Figure 4C:
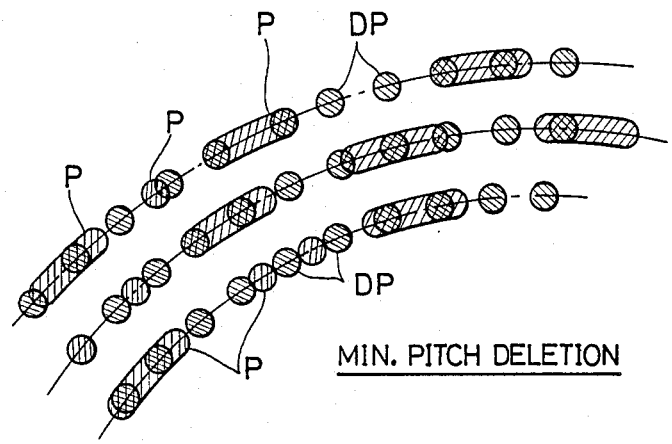
FIG. 4C is an illustration showing delete pits formed with the minimum pit pitch along the original pit arrangement.

FIG. 4C shows an example where the recorded pits P are destroyed or deleted by delete pits DP having a constant minimum pit pitch of 2-7 code, for instance. In this 2-7 code modulation method, the intervals of the circular arc shaped pits are changed from 2 to 7 in proportion. A more detailed description of the 2-7 code is disclosed in U.S. Pat. No. 4,115,768, which is incorporated herein by reference. To delete the recorded information in this way, the delete signal generator 100 is a minimum pit pitch signal generator for generating a minimum pit pitch signal to the semiconductor laser 20.

Figure 4D:
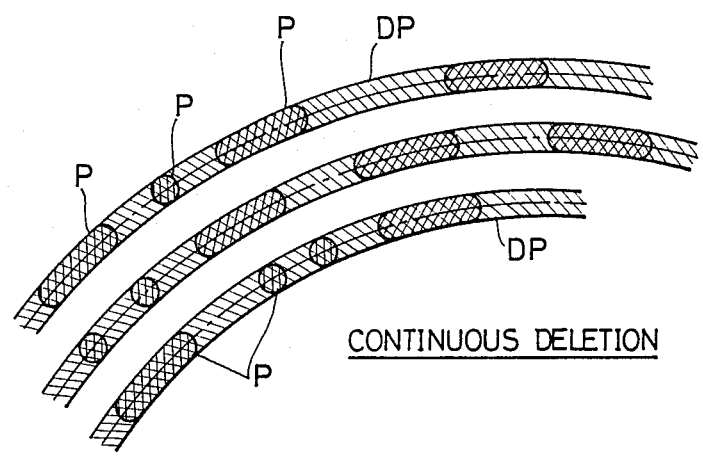
FIG. 4D is an illustration showing delete pits formed in continuous groove fashion along the original pit arrangement.

FIG. 4D shows an example where the recorded pits P are destroyed or deleted by continuous pits DP. In this case, the delete signal generator 100 is a continuous signal generator for generating a dc signal to the semiconductor laser 20.

The delete operation of the optical information storage apparatus of the present invention will be described hereinbelow with reference to a flowchart shown in FIG. 5.

Control of the CPU 31 checks whether the delete key 39 is depressed or not (in step 301). If depressed, control checks whether a retrieval index of information required to be deleted is designated through the alpha/numeric keys 44 (in step 302). If designated, control moves the optical head 10 to the retrieval index recording area 210 of the optical disc 200 to retrieve the designated retrieval index position on the basis of the designated index (in step 303), and then records a delete mark 214 in the corresponding area of the designated retrieval index (in step 304) to implement an indirect information deletion.

Further, where the direct delete key 41 is depressed and this is checked by the CPU (in step 305), control moves the optical head 10 to the information recording area 220 of the optical disc 200 on the basis of the designated retrieval index (in step 306), and further superimposes a delete signal upon the recorded information corresponding to the designated retrieval index (in step 307) to implement a direct information deletion. The delete signal is a random number signal, a minimum pit pitch signal or a continuous signal.

In the above description, only a delete mark 214 is recorded in the retrieval index recording area. However, it is of course possible to delete all the retrieval index area required to be deleted in the same way as in the direct deletion method adopted for deletion on the information recording area.

Further, the optical information storage apparatus of the present invention applied to a picture information filing apparatus has been described by way of example. However, it is of course possible to apply the apparatus of the present invention to various apparatus to which an information storage apparatus is incorporated.

As described above, in the optical information storage apparatus of the present invention, since information recorded on the information recording area of an optical disc can directly be deleted perfectly in addition to the indirect deletion such that only the retrieval index is deleted on the retrieval index recording area of the optical disc, and further the above direct and indirect deletion can be selected, it is advantageous to record and then delete confidential information.

What is claimed is:

1. An information processing apparatus comprising:
   means for recording a pit as an irreversible physical reaction on an optical memory corresponding to an information; and
   means for deleting the information recorded on the optical memory, said deleting means having a first deleting means for recording a deletion mark representing that the information is deleted on the optical memory and a second deleting means for physically deleting the information recorded on the optical memory, said second deleting means having means for superimposing a pit upon the information pit on the optical memory.

2. The information processing apparatus as set forth in claim 1, wherein said second deleting means has a random number signal generator.

3. The information processing apparatus as set forth in claim 1, wherein said second deleting means has a minimum pit pitch signal generator.

4. The information processing apparatus as set forth in claim 1, wherein said second deleting means has a continuous signal generator.

5. The information processing apparatus as set forth in claim 1, which further comprises selecting means, coupled to said recording means, for allowing an operator to select a first deleting method of recording a deletion mark representing that the information is deleted on the optical memory and a second deleting method of physically deleting the information recorded on the optical memory by superimposing a pit upon the information pit on the optical memory.

6. A method of deleting information recorded on an optical information storing medium having a retrieval index storing area and an information storing area through an optical storage apparatus including an optical head, a keyboard having a delete key, a direct delete key and alpha/numeric keys, which comprises the following steps of:
 (a) checking whether the delete key is depressed;
 (b) if depressed, checking whether a retrieval index to be deleted is designated through the alpha/numeric keys;
 (c) if designated, moving the optical head to the designated retrieval index position recorded on the retrieval index storing area on the basis of the designated retrieval index;
 (d) record a delete mark on the designated retrieval index position;
 (e) checking whether the direct delete key is depressed;
 (f) if depressed, moving the optical head to the designated information position recorded on the information storing area on the basis of the designated retrieval index; and
 (g) superimposing a delete signal upon the recorded information to directly delete the recorded information.

7. An information processing apparatus, which comprises:
 (a) means for inputting an information;
 (b) buffer means for storing information input by said inputting means;
 (c) means for displaying the information stored by said buffer means;
 (d) means for recording the information on the optical memory;
 (e) keyboard means for recording the information stored by said buffer means on an optical memory;
 (f) means for generating an information deletion signal; and
 (g) means for deleting the information recorded on the optical memory, said deleting means having a first deleting means for recording a deletion mark representing that the information is deleted on the optical memory and a second deleting means for physically deleting the information recorded on the optical memory, said second deleting means having means for superimposing a pit upon the information pit on the optical memory.

8. The information processing apparatus as set forth in claim 7, wherein said keyboard means further comprises a selector key for allowing an operator to select an indirect deletion such that only a retrieval index is deleted by recording a delete mark on the corresponding retrieval index storing area and a direct deletion such that a retrieval index recorded on the retrieval index storing area and information recorded on the information storing area are both deleted from the optical information storing medium.

* * * * *